United States Patent [19]
Mol

[11] 3,973,046
[45] Aug. 3, 1976

[54] METHOD FOR PREPARING A MIXTURE OF FINELY CRYSTALLIZED FAT AND A POWDER

[75] Inventor: Jan Mol, Ermelo, Netherlands

[73] Assignee: N.V. Houdstermaatschappij Holland Agro, The Hague, Netherlands

[22] Filed: July 7, 1975

[21] Appl. No.: 593,565

Related U.S. Application Data

[63] Continuation-in-part of Ser. No. 264,561, June 20, 1972, abandoned.

[30] Foreign Application Priority Data
June 23, 1971 Netherlands.................... 7108689

[52] U.S. Cl.............................. 426/289; 426/98
[51] Int. Cl.² ...................................... A23L 1/00
[58] Field of Search ............ 426/98, 289, 294, 295, 426/285

[56] References Cited
UNITED STATES PATENTS

| | | |
|---|---|---|
| 2,557,283 | 6/1951 | Hansen .................. 426/98 |
| 2,703,059 | 3/1955 | Kaser ..................... 426/295 X |
| 2,949,365 | 8/1960 | Becker ................... 426/98 X |
| 3,384,494 | 5/1968 | Colby et al. ........... 426/285 |
| 3,486,908 | 12/1969 | Bedenk et al. ........ 426/556 |
| 3,551,166 | 12/1970 | Baum et al. ........... 426/98 |
| 3,647,480 | 3/1972 | Cermak ................. 426/285 |

Primary Examiner—Joseph M. Golian
Attorney, Agent, or Firm—Spencer & Kaye

[57] ABSTRACT

A method for preparing a mixture of finely crystallized fat, or a fat blend, and a powder, the fat being cooled in predominantly molten condition to a temperature below the gel point and in plastic form by means of extrusion being shaped into ribbons that without any further cooling at the moment of emerging from the extrusion orifices are simultaneously divided and mixed with the powder.

17 Claims, 1 Drawing Figure

U.S. Patent  Aug. 3, 1976  3,973,046
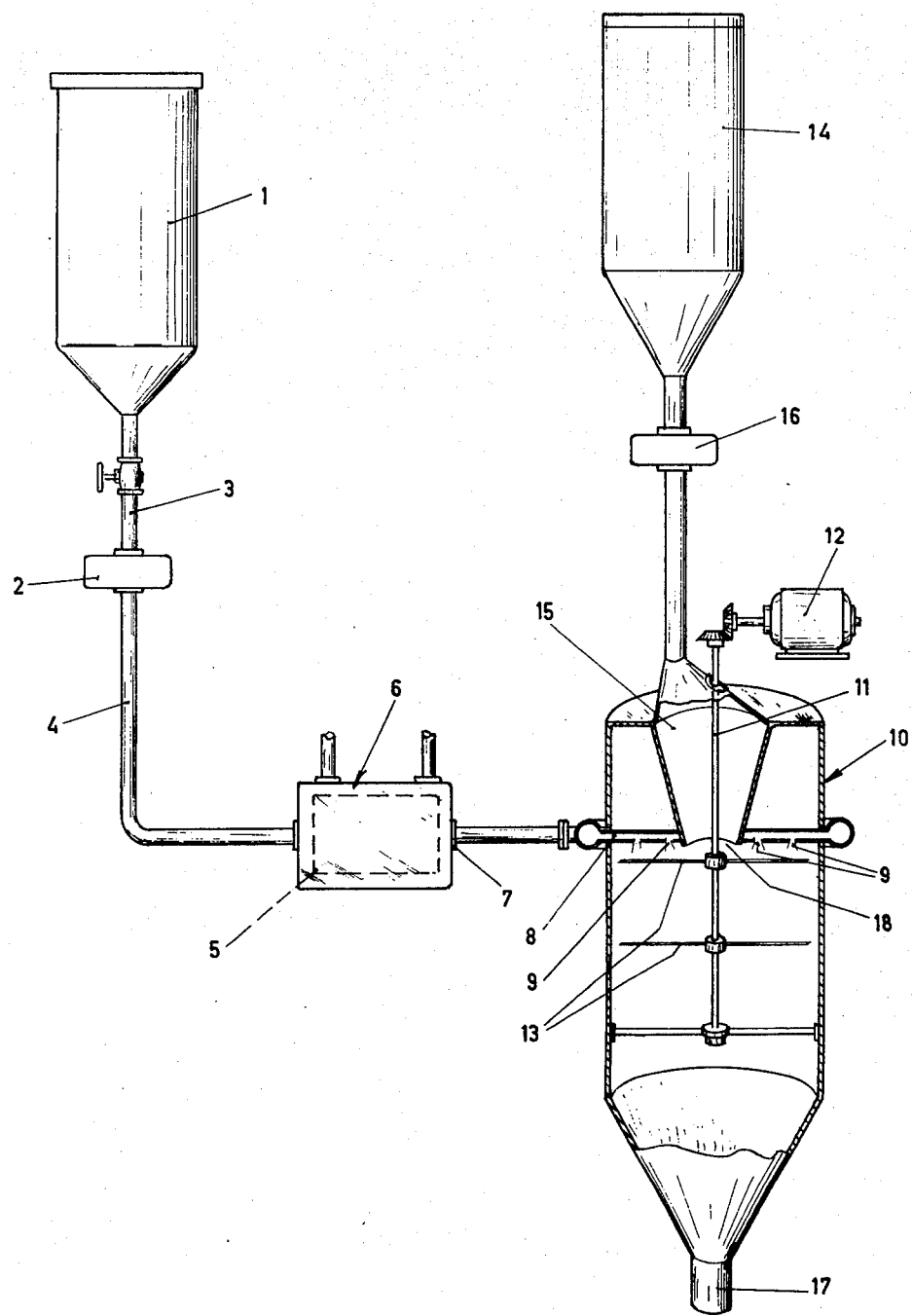

METHOD FOR PREPARING A MIXTURE OF FINELY CRYSTALLIZED FAT AND A POWDER

CROSS-REFERENCE TO RELATED APPLICATION

This application is a continuation-in-part of copending Application Ser. No. 264,561, filed June 20, 1972, now abandoned, which is hereby incorporated by reference.

BACKGROUND OF THE INVENTION

The invention relates to a method for preparing a mixture of finely crystallized fat, or fat blend, and a powder.

With regard to preparing margarine, it is known in the art that a fat, or a fat blend, may be cooled in a predominantly molten condition to a temperature below the gel point, such that the fat, or the fat blend crystallizes partially into a plastic mass that is readily transportable in equipment.

It is furthermore known in the art that with regard to preparing a cooking-fat, a fat, or a fat blend may be shaped in plastic form into ribbons by means of extrusion, which ribbons again are divided into parts and then are entirely coated with a non-self-adhesive material, such as, for instance, skimmed-milk powder. Such coated particles of fat, or fat blend are stored or packed without loosing their identity on mutual contact or when sticking together.

They are destined to be blended, in a later stage, with a baking mixture, in which they then disintegrate again into the separate particles that are entirely coated with powder and give rise to an even distribution of the fat in the baked finished product. It appeared, however, that they are unsuitable to be mixed with a powder into a mixture that has to be processed into a liquid finished product because they disperse very poorly in water.

SUMMARY OF THE INVENTION

It is the object of the invention to provide a method for the preparation of a mixture of a fat, or a fat blend and a powder, which mixture is readily and quickly dispersable in water.

According to the invention, the plasticized fat, or fat blend, is divided into very small particles and uniformly mixed with a powder, without the particles being entirely coated by this powder.

The present invention is characterized in that without further cooling the ribbons of fat, or fat blend, formed are, at the moment of emerging from the extrusion orifices, simultaneously divided and mixed with the powder.

The molten fat, or fat blend, is, in a way known in the art, via a dosing pump, led into a cylinder provided with rotating scraping devices at a temperature at which the fat, or the fat blend, is entirely or partially fluid and then cooled in the cylinder by means of externally provided cooling means to a temperature below the gel point, it partially crystallizing into a plastic mass, which without any further rise in pressure, is fed straight into the mixing system through orifices of a small diameter.

This mixing system consists of a vertical cylinder provided with a rotating vertical shaft with adjustable knives, with the powder being dosed coming from the upper side and the fat, or fat blend, coming from the orifices in the shape of small ribbons.

The hardened mass of fat is transportable in dependence upon temperature and pressure of the propelling elements, i.e., the lower the temperature, the higher this pressure must be.

Preferably, this temperature should lie between 0°C and 20°C, depending on the gel point of the fat, or fat blend chosen, because then the transport of the partially crystallized mass of fat through the orifices can still take place without any further rise in pressure. The orifices may have a flow-through area of even 0.2 mm$^2$.

The number of orifices, i.e., the total area of outflow, then is adapted to the dosing amount, and the space between the orifices is such, e.g., 5 mm, that the emerging small ribbons of fat, or fat blend, do not stick together instantaneously.

Advantageously, the area of flow-through for each orifice ranges from 0.2 to 8.5 mm$^2$.

An immediate advantage of the method according to the invention is the fact that the small ribbons of fat, or fat blend, in the mixing system need not be cooled any further, so that a considerable simplification of the equipment used is obtained and consequently an important saving in the investment. Moreover, the fat, or the fat blend, emerges from the orifices in such a plastic condition that is is readily, and in a very short time, mixable with the dosed powder at ambient temperature, the condition being that the distribution of the small ribbons and mixing with the dosed powder must take place simultaneously.

Owing to the very short mixing time of the total mixture, no appreciable rise in temperature of the finished product takes place, which is important for its keeping qualities.

Even in the event of prolonged storage, whether or not under weight pressure and at temperatures varying within the melting range of the fat blend used, the mixture does not show a tendency to coagulate; it remains stable and is readily and quickly dispersable in water.

As is known in the art, the fat, or the fat blend, may consist of one or a mixture, respectively, of the following raw materials: whether or not hardened coconut oil, palm oil, soya oil, ground nut oil, palm kernel oil, rape seed oil, sesame oil, sunflower oil, cotton-seed oil, beef suet, mutton fat, lard, fish oil, whale oil and the like. Conventional additives, such as, for example, soya lecithin and other emulsifiers or surface-active agents; anti-oxidants, such as butylhydroxytoluene and the like; and scenting and flavoring materials, such as butter flavor can be used in admixture with the fat.

As is known in the art, the powder can consist of one or a mixture of the following raw materials as food powder: skimmed-milk powder, whey powder which may be desugarized or desalted, starch decomposed or not decomposed, dextrose, maltose, saccharose, soya flour defatted or non-defatted or its carbohydrates being removed, fish solubles, protein preparates obtained by means of yeast cultures, hydrolyzed animal and/or vegetable protein, casein or caseinates, and the like. Conventional food additives, such as minerals, vitamins, antibiotics, bio-catalysts, chemotherapeutic and other raw materials to be processed may be present in mixture in the food powder used in the present invention.

DESCRIPTION OF DRAWING

The drawing schematically shows a vertical cross-section through a mixing-device that is connected with other apparatus for preparing a mixture of finely divided crystallized fat, or fat blend, and a powder in accordance with the present invention.

DETAILED DESCRIPTION OF THE INVENTION

Referring to the drawing, there is shown a tank 1, containing molten or liquid fat, which is connected with a dosing pump 2 via a pipe-conduit 3.

From a dosing-pump 2, the molten fat is led via a tube-conduit 4 to a scrape-knife-cooler 5, provided with an external cooling-system 6.

Outlet 7 of cooler 5 is connected with an annular-shaped hollow body 8, the underside of which is provided with holes or orifices 9. This body 8 is situated near the top of a mixing device 10, which is provided with a vertical shaft 11 driven by an electric motor 12 and provided with adjustable knives 13. Tank 14, containing a powder, is connected with a hopper 15 via dosing device 16. This hopper 15 is situated at the top of mixing device 10, and the outlet of it is at the same level as holes 9.

In the practice of the invention, tiny semi-solid fat ribbons emerge from orifices 9, while at the same time, a powdery product falls from hopper 15. The emerging stream of semi-solid ribbons and the falling stream of food powder meet the knives 13 rotating on a vertical shaft, which knives exert a cutting action on the fat ribbons and, simultaneously with the cutting action, exert a mixing action of the cut ribbons and falling food powder.

The tiny fat ribbons are cut by the rotating knives 13 while being surrounded by a cloud of falling powder particles. The fat ribbons are cut to minute pieces. The extent to which such occurs depends on the dimensions of the apparatus, the setting of the adjustable knives, the number of knives and the like. Any form of knives can be used so long as they have a cutting action.

The mixed product of food powder and fat particles is discharged from outlet 17.

In a specific embodiment of the invention, a method is provided for preparing a mixture of finely crystallized fat and a powder selected from the group of food-materials consisting of at least one of skimmed-milk powder, whey powder, starch, dextrose, maltose, saccharose, soya flour, fish solubles, protein, casein, and caseinates, in which usual food additives may have been incorporated, the powder being finely divided in such a way as required for forming a substantially instant aqueous dispersion, comprising: (a) cooling the fat from a predominantly molten condition to a temperature below its gel point to partially crystallize the fat into a plastic mass; (b) shaping the partially crystallized fat by extrusion into ribbons into a space into which also appropriate amounts of the powder are supplied from above and in which knives are rotating on a vertical shaft; (c) dividing the extruded ribbons into small fat particles, having substantially the same range of dimensions as the powder used, by the action of said rotating knives in the presence of the powder falling through said space; thereby, at least partly, covering the fat particles with the powder; and (d) simultaneously with the dividing of the ribbons and the covering of the divided fat particles, uniformly mixing the fallen divided and at least partly covered fat particles with the falling powder in a weight ratio between 2:4 and 1:8 without further cooling the fat into a free flowing powdery mixture which can be readily dispersed in an aqueous fluid. It will be understood that the amount of powder used in step (b) corresponds to the weight ratio of powder to fat particles in step (d).

As will be apparent to one of ordinary skill in the art, the size and dimensions of an apparatus for producing the product of the present invention will depend on various factors, including especially, the particular product to be made and the required production rate. Thus, an apparatus for producing 10 to 20 metric tons of product per hour will show quite different dimensions and settings than a pilot plant for producing, for example, 60 kilograms per hour.

For example, in a production plant having a capacity of 2 to 4 metric tons per hour of artificial milk powder for cattle feed, the preferred height of the mixing device can be 127 cm, and for a plant having a capacity of 8 to 13 tons per hour, the preferred height is 164 cm. Obviously, the number of orifices and consequently the total cross section of the mixing device is also dependent on the required production.

The total production capacity also determines the rate of feed of the fat and powder particles. Thus, for example, in a pilot plant for the production of 1 kilogram of product per minute with a ratio of 1:4 between fat and powder, about 200 grams of fat are extruded per minute and 800 grams of powder are dosed into the mixer per minute. However, in a plant for a production of 12 metric tons per hour or 200 kg per minute, for the same ratio of 1:4, 40 kg of fat are extruded per minute and 160 kg of powder are supplied at the same time.

The particle dimensions, including the maximum and minimum particle dimensions, of the cut off fat particles and of the resulting final product are generally in the same range and can be varied by utilizing larger or smaller extrusion orifices, respectively, and by enlarging or reducing the rotational speed of the shaft with the adjustable knives, as well as by adjusting the inclination of the knives. The required rotational speed of the knives strongly depends on the required particle dimensions and is easily determined by experiment.

The fat ribbons should be divided in such a way as to produce a free flowing product which may be readily dispersed in an aqueous liquid without showing any observable lumps. A prime factor in establishing the readily dispersible properties of the final product is the particle size and particle size distribution of the particles. In practice, the minimum diameter of the cut fat particles and the free flowing final powder product is about 10 microns. The product made should be a substantially instant powder as regards dispersion in aqueous fluids. Upper and lower limits depend on the application aimed at for the product to be made. However, in practice, an upper limit would be about 1,000 microns and a lower limit would be about 10 microns. Preferably, at least about 95% of the particles of the final product have a size less than 420 microns, and the remaning about 5% can range between 420 and 1,000 microns. For certain cattle feed products, about 75 to 80% of the particles should be between about 200 and 420 microns in diameter and 15 to 20% below about 200 microns. Substantially no particles should be below 10 microns. A typical particle distribution would show 80% of the particles in the range of 200 to 400 microns and not more than 20% smaller in size. To provide substantially instant aqueous dispersibility, the particle distribution of the food powder generally is the same as the fat particles and final product. Thus, a typical food powder used in the practice of the present invention will also have a particle distribution of 80% of the particles in the range of 200 to 400 microns and not more than 20% smaller in size.

The cut off fat particles fall down and are agitated by the rotating knives in a cloud of powder particles and, at the lower end of the mixing apparatus, the resulting final mixture of particles is collected and discharged.

The "falling time" of the particles in the mixing device depends strongly on the setting of the adjustable knives. If the knives are inclined so as to throw the particles upwards, the falling times can be enlarged greatly. In general, the falling time will be a few seconds, such as, for example, from 1 to 10 seconds, with the knives inclined so as not to throw the particles upwardly.

In the final product of the present invention, the fat particles are at least partly covered by powder particles. The amount of each fat particle that is covered with powder depends, in part, on the supply ratio of fat and powder particles. The particular ratio between the limits of 1:2 and 1:8 should be such that the fat particles are protected by the powder particles from being sticky and lumping together. Because of their production in a cloud of falling powder particles, the sticky parts of the fat particles will be covered by the powder particles, but as far as the surface is formed by a non-sticky fat crystal, none or very few powder particles will adhere to it. That is the reason why on observation under a microscope the fat particles show parts uncovered by the powder, but this also depends on the particular kind of fat used. As far as the surface of these fat particles is sticky, it is substantially covered by powder particles.

The provision of a final product having readily dispersibility properties is of prime importance in the practice of the present invention and is more important than the establishing of a specific percentage of fat particle area which is covered or not covered. Thus, the overall properties of the product are more important than the relation of those properties to such a percentage, which to a great extent, depends on the kind of fat used. In general, however, from 30 to 100% and, preferably, from 50 to 80 % of the area of each fat particle is covered with powder particles.

As stated above, the fat particles are divided while falling in a cloud of falling powder particles. As far as the surface of the semi-crystallized fat is sticky the powder will adhere. In order to prevent the fat particles from agglomerating or forming lumps, it is important that the sticky parts of the fat particles substantially are covered with powder particles, which powder particles have dimensions of more or less the same range as the fat particles. A more or less spherical fat particle cannot be 100% covered by more or less spherical powder particles. Thus, how much of the sticky parts of the surface area of the fat particles are covered by powder particles also depends on the packing of the particles.

The fat may be partially crystallized, which means that at the point in the crystallization process where the fat is in a plastic condition and is sufficient transportable in the apparatus, it can already be applied in the present method.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE I

A fat blend, consisting of equal parts of beef suet and lard, about 5% of soya lecithin, 0.01% of butylhydroxytoluene in liquid form at 50°C, was fed into a scraping-knife cooler and cooled to 15°C and in plastic condition then arisen, without any further cooling and further raising of the pressure, fed through orifices that are provided in a plate sealing the discharge, the orifices each having a flow-through area of 1.8 mm$^2$ and spaced apart from each other at distances of 5 mm. The orifices debouch directly into the upper side of a mixing system, comprising a vertical cylinder with a rotating vertical shaft provided with adjustable knives.

A powder, consisting of a mixture of 68% of skimmed-milk powder, 15% of gelatinized starch, 15% of whey powder, 2% of minerals and vitamins, was fed into the upper side of the mixing system at an ambient temperature of 20°C.

Immediately after emerging from the orifices, the fat blend ribbons were reduced in length and at the same time mixed with the dosed powder in a weight ratio of 2:4, without any further cooling being effected.

In the mixture obtained, which had a temperature of 19°C, the fat particles were distributed very uniformly through the powder, without being entirely coated by the powder.

The size of 94.8% of the grains of the finished product amounted to less than 420 microns and that of 5.2% varied in size from 420 to 1,000 microns.

The finished product was stored in bales piled one on top of another and at varying ambient temperatures, also varying within the melting range of the fat blend used.

After a storage period of 6 months, the mixture did not show any tendency to coagulate and it had retained its free-flowing property. The mixture was completely and quickly dispersible in water.

EXAMPLE II

A fat blend, consisting of equal parts of lard and palm kernel oil, 3% of lecithin and 2% of glycerol-mono-oleate was, in liquid form and at 45°C, fed into the scraping knife cooler in the same way as described in Example I, cooled to 12°C and, via the orifices that now had a flow-through area of 0.2 mm$^2$, fed directly into the upper side of the mixing system.

A powder, consisting of a mixture of 25% of skimmed-milk powder, 25% of defatted soya flour, 15% of whey powder of low lactose content, 10% of gelatinized starch, 10% of whey powder, 10% of buttermilk powder, 5% of minerals and vitamins was also fed into the upper side of the mixing system at an ambient temperature of 22°C.

The fat blend ribbons were again reduced in length instantaneously and mixed with the dosed powder in a weight ratio of 1:8. In the finished product, which had a temperature of 21°C, the fat particles again were uniformly distributed in the powder without being completely coated with powder. The size of 93.5% of the grains amounted to less than 420 microns and 6.5% of them varied in size between 420 and 800 microns.

This finished product was also stored in bales piled one on top of another and at varying ambient temperatures, even varying within the melting range of the fat blend used.

After 6-month storage, this mixture did not show any tendency to coagulate either and it had retained its free-flowing property.

The mixture was completely and quickly dispersible in water.

It will be understood that the above description of the present invention is susceptible to various modifications, changes and adaptations, and the same are intended to be comprehended within the meaning and range of equivalents of the appended claims.

What is claimed is:

1. A method for preparing a mixture of a finely crystallized fat and a powder selected from the group consisting of at least one of skimmed milk powder, whey powder, starch, dextrose, maltose, saccharose, soya flour, fish solubles, protein, and caseinates comprising:
    a. cooling the fat from a predominantly molten condition to a temperature below its gel point to partially crystallize the fat into a plastic mass;
    b. shaping the partially crystallized fat by extrusion through an extrusion orifice into ribbons into a space into which the powder is supplied from above and in which knives are rotating on a vertical shaft;
    c. dividing the ribbons into small fat particles by cutting with said rotating knives immediately after the ribbons emerge from the extrusion orifice; and
    d. simultaneously with said dividing of the ribbons, uniformly mixing the divided emerging ribbons of fat with the powder in said space in a weight ratio between 2:4 and 1:8 without further cooling of the fat and without entirely coating the fat particles with the powder to form a mixture which can be readily dispersed in an aqueous fluid.

2. The method according to claim 1 wherein the flow-through area of the extrusion orifice ranges from 0.2 mm$^2$ to 8.5 mm$^2$.

3. The method according to claim 1 wherein there are at least two extrusion orifices that are spaced apart at a distance of 5 mm.

4. The method according to claim 1 wherein the fat is cooled to a temperature between 0° and 20°C.

5. The method according to claim 1 wherein at least about 95% of the fat particles have a size less than about 420 microns.

6. The method according to claim 1 wherein about 75 to 80% of the fat particles have a size range between 200 and 420 microns.

7. The method according to claim 1 wherein 15 to 20% of the fat particles are below about 200 microns.

8. A method for preparing a mixture of a finely crystallized fat and a powder selected from the group of food-materials consisting of at least one of skimmed milk powder, whey powder, starch, dextrose, maltose, saccharose, soya flour, fish solubles, protein, and caseinates, said food powder being finely divided in such a way as required for forming a substantially instant aqueous dispersion, comprising:
    a. cooling the fat from a predominantly molten condition to a temperature below its gel point to partially crystallize the fat into a plastic mass;
    b. shaping the partially crystallized fat by extrusion through an extrusion orifice into ribbons into a space into which the powder is supplied from above in a weight ratio between 2:4 and 1:8 between fat and powder and in which knives are rotating on a vertical shaft;
    c. dividing the extruded ribbons into small fat particles having substantially the same range of dimensions as the powder used, by the action of said rotating knives in the presence of the powder falling through said space; thereby at least partly covering the fat particles with the powder; and
    d. simultaneously with said dividing of the ribbons and said covering of the divided fat particles, uniformly mixing the fallen, divided, and at least partly covered fat particles with the falling powder without further cooling the fat, into a freeflowing powdery mixture which can be readily dispersed in an aqueous fluid.

9. The method according to claim 8 wherein the flow-through area of the extrusion orifice ranges from 0.2 mm$^2$ to 8.5 mm$^2$.

10. The method according to claim 8 wherein there are at least two extrusion orifices that are spaced apart at a distance of 5 mm.

11. The method according to claim 8 wherein the fat is cooled to a temperature between 0° and 20° C.

12. The method according to claim 8 wherein at least about 95% of the fat particles have a size less than about 420 microns.

13. The method according to claim 8 wherein about 75% to 80% of the fat particles have a size range between 200 and 420 microns.

14. The method according to claim 8 wherein 15 to 20% of the fat particles are below about 200 microns.

15. The method as defined in claim 8 wherein the protein is casein.

16. The method as defined in claim 8 wherein food additives are incorporated into the food powder.

17. The method as defined in claim 8 wherein the ratio of fat to food powder in step (*b*) is the same as in step (*d*).

* * * * *